United States Patent [19]

Nee

[11] Patent Number: 4,791,814
[45] Date of Patent: Dec. 20, 1988

[54] SYSTEM AND METHOD FOR DETECTING LIQUID LEAKAGE IN STORAGE TANKS

[75] Inventor: Victor W. Nee, South Bend, Ind.

[73] Assignee: Environment and Safety, Inc., Santa Clara, Calif.

[21] Appl. No.: 123,323

[22] Filed: Nov. 20, 1987

[51] Int. Cl.⁴ .............................................. G01N 3/26
[52] U.S. Cl. ..................................... 73/49.2; 73/299
[58] Field of Search ............... 73/290 R, 299, 40, 49.2

[56] References Cited

U.S. PATENT DOCUMENTS

| | | | |
|---|---|---|---|
| 1,634,427 | 7/1927 | King | 73/302 |
| 3,377,844 | 4/1968 | Gandolfo | 73/49.2 |
| 3,460,386 | 8/1969 | Guignard | 73/299 |
| 3,494,178 | 2/1970 | Tuttle | 73/49.2 |
| 3,538,746 | 11/1970 | Jacobs et al. | 73/49.2 |
| 3,691,821 | 9/1972 | Davey | 73/49.2 |
| 3,939,383 | 2/1976 | Alm | 73/49.2 |
| 4,097,852 | 6/1978 | Usry | 340/242 |
| 4,442,702 | 4/1984 | Sawada | 73/49.2 |
| 4,639,738 | 1/1987 | Young et al. | 73/301 |
| 4,646,560 | 3/1987 | Maresca, Jr. et al. | 73/49.2 |
| 4,649,739 | 3/1987 | Horner | 73/49.2 |

FOREIGN PATENT DOCUMENTS

| | | | |
|---|---|---|---|
| 1817678 | 6/1970 | Fed. Rep. of Germany | 73/49.2 |
| 1817676 | 6/1970 | Fed. Rep. of Germany | |
| 1961693 | 7/1970 | Fed. Rep. of Germany | |
| 392945 | 10/1909 | France | 73/299 |
| 347458 | 6/1960 | Switzerland | |
| 458728 | 3/1975 | U.S.S.R. | |

Primary Examiner—Stewart J. Levy
Assistant Examiner—Hezron E. Williams
Attorney, Agent, or Firm—Burns, Doane, Swecker & Mathis

[57] ABSTRACT

A liquid leakage detection system for use in underground storage tanks includes at least two vertically-disposed tubular members mounted to be partially immersed in liquid in the tank. A valve selectively opens and closes the lower end of at least one of the tubular members and air-bleed valves are connected to the upper ends of at least two other of the tubular members. With the air-bleed valves closed, a differential pressure transducer is connected to sense the gas pressure in the tubular members. A control system selectively operates the valves so that the pressure transducer indicates changes in liquid levels within the tank caused by leakage.

7 Claims, 3 Drawing Sheets

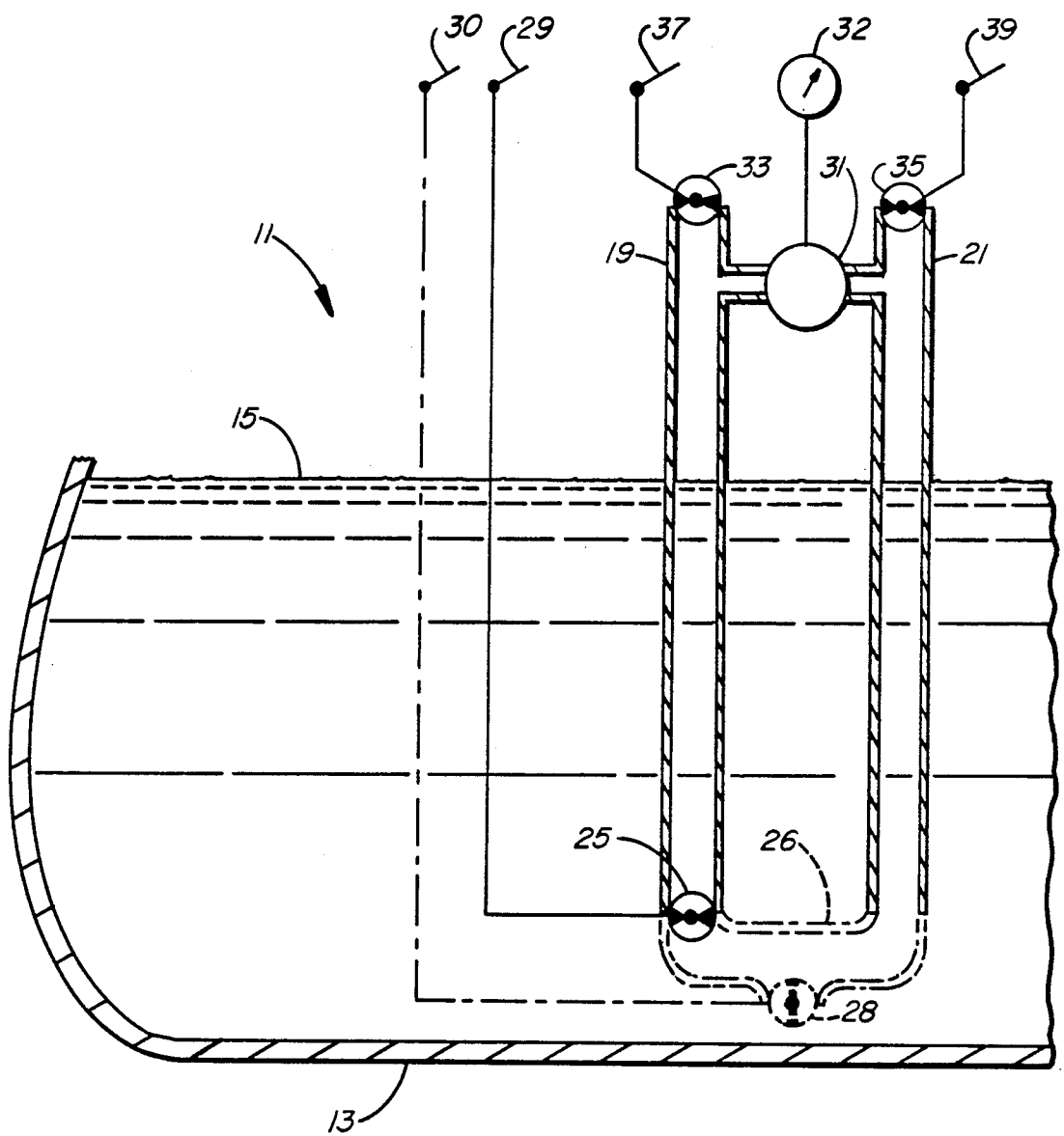
FIG._1.

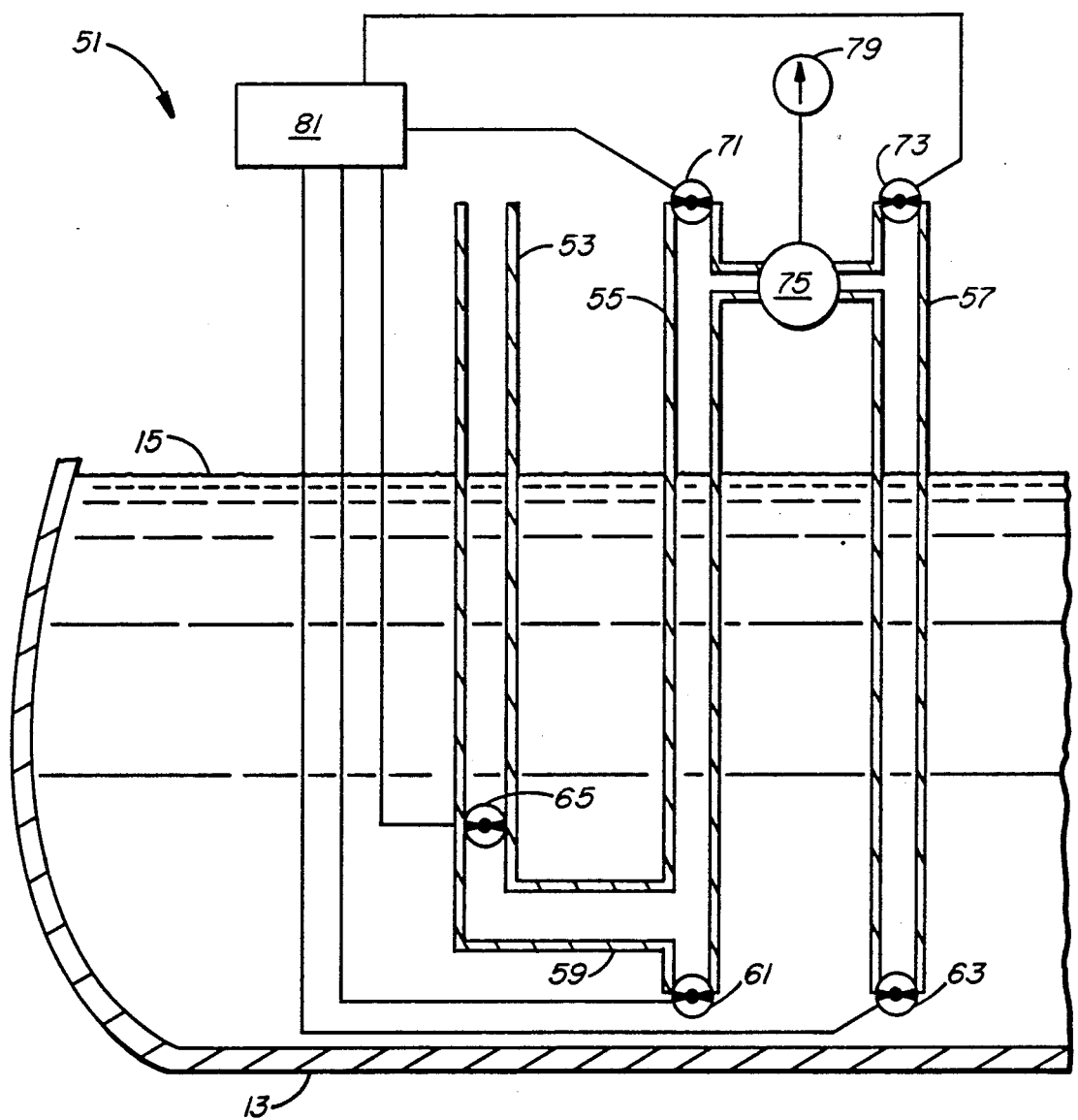
FIG._2.

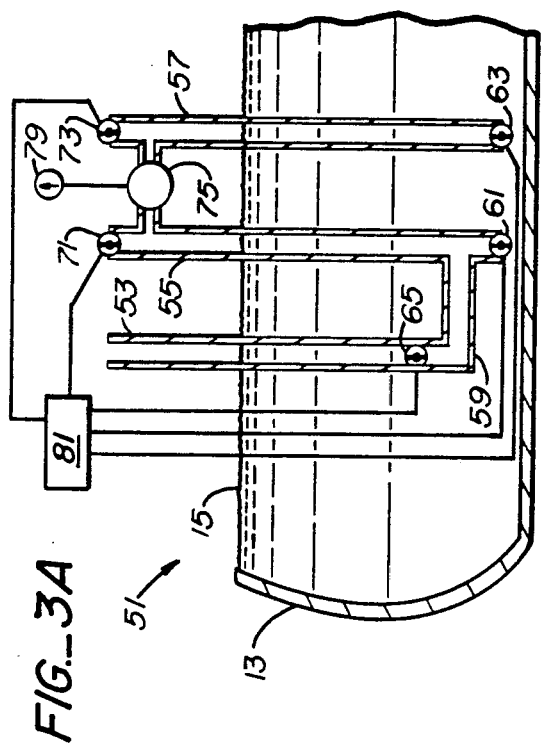
FIG._3A
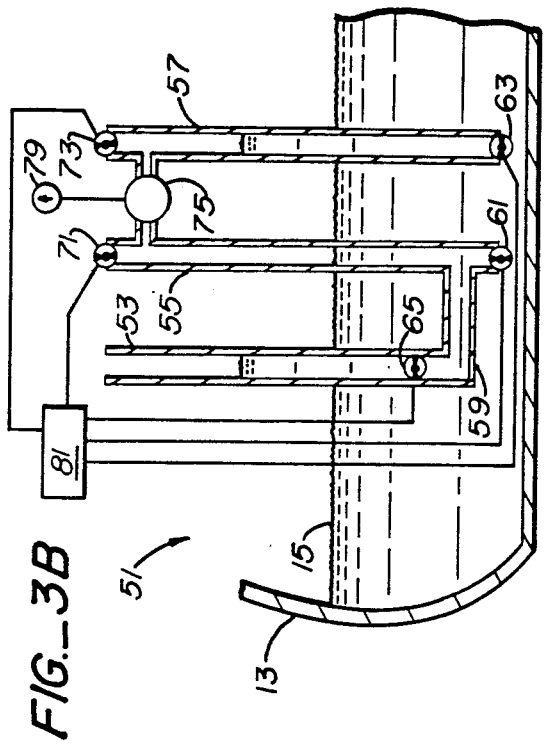
FIG._3B
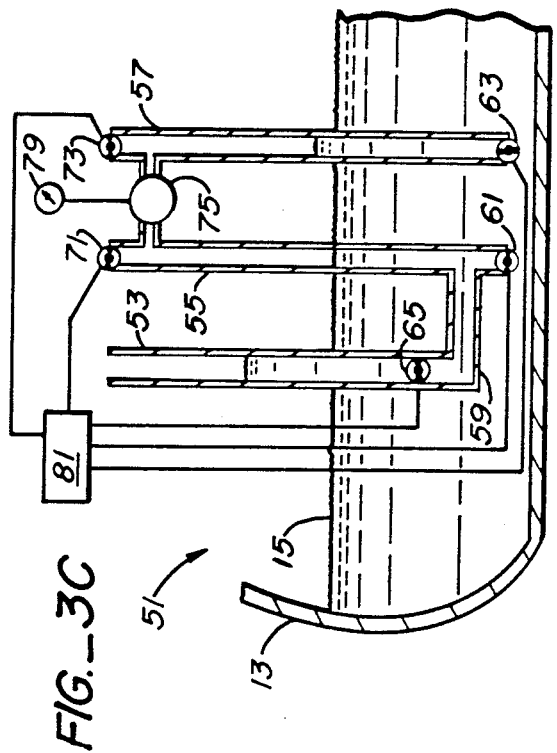
FIG._3C
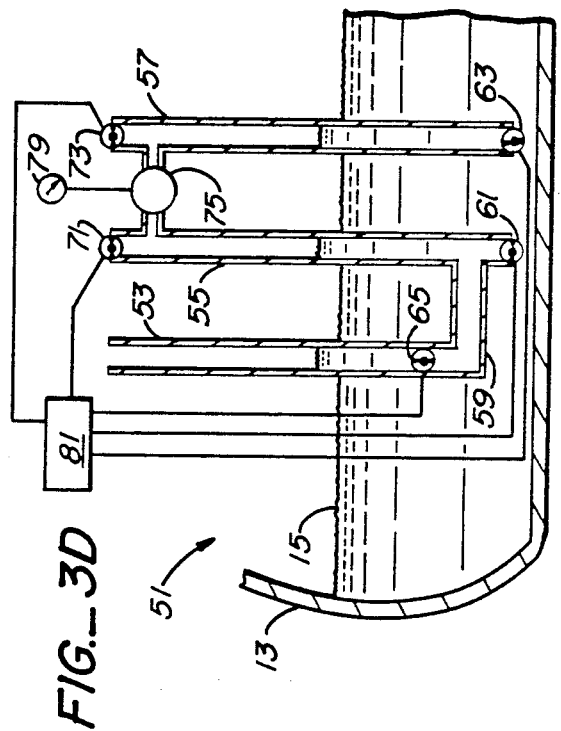
FIG._3D

SYSTEM AND METHOD FOR DETECTING LIQUID LEAKAGE IN STORAGE TANKS

BACKGROUND OF THE INVENTION

1. Field of the Invention

The present invention generally relates to detection of leakage in tanks that store liquids and, more particularly, to detection of liquid leakage in underground storage tanks.

2. State of the Art

It may be appreciated that detection of liquid leakage in underground storage tanks is difficult, especially when tank volumes exceed several hundred gallons. In such tanks, leaks of a fraction of a gallon per hour may represent only minute changes in the volume of the tanks but, nevertheless, can cause substantial economic los over a period of time. Also, liquid leakage from underground storage tanks can cause groundwater pollution which, in turn, may affect drinking water supplies. Because of threats to drinking water posed by underground tank leakage, numerous environmental standards have been promulgated that, typically, mandate leakage of no more than 0.05 gallons per hour underground from storage tanks containing hazardous liquids. Also, it should be noted that leakage of groundwater into storage tanks can contaminate the contents of the tanks and should also be avoided.

One known method to detect liquid leakage in underground storage tanks relies upon measurements of hydrostatic pressure. According to this method, tanks are filled sufficiently to cause flow into a standpipe, then pressure changes at the standpipe are monitored. In conjunction with such pressure measurement techniques, compensation for temperature effects is normally required. Typically, systems to provide temperature compensation are complicated, time consuming, and somewhat inaccurate.

Another known technique to detect liquid leakage in underground storage tanks involves monitoring liquid levels in the tanks. Such techniques are complicated by the fact that liquid elevations can vary due to factors other than leakage, such as temperature, vibration and, evaporation. Thus, liquid level monitors normally require compensation for thermal and other effects. Here again, such compensation systems are usually complicated and somewhat inaccurate.

OBJECTS AND SUMMARY OF THE INVENTION

A primary object of the present invention is to provide improved ways and means for detecting liquid leakage in underground storage tanks.

More particularly, an object of the present invention is to provide improved ways and means to detect liquid leakage in underground storage tanks by monitoring changes in the elevation of liquid in the tanks without requiring compensation for temperature, evaporation, and other effects not due to liquid inflow or outflow leakage from the tanks.

In accordance with the preceding objects, the present invention provides, in one embodiment, a system for detecting leakage in liquid storage tanks comprising: first and second vertically disposed tubular members, a valve to selectively close the lower end of the first tubular member, a pressure transducer sealingly connected to the upper ends of the first and second tubular member to sense differentials in gas pressure between their interiors, and control means to selectively operate the valve such that, when the first and second tubular members are submerged in liquid in the tank so that liquid partly fills the tubular members and the valve has been closed, the pressure transducer indicates changes in liquid levels within the tank caused by leakage.

In another embodiment, the present inventions provides a system for detecting liquid leakage in liquid storage tanks comprising: three vertically-disposed tubular members, a fourth tubular member that connects the lower ends of the first and second tubular members, a first valve mounted to selectively prevent liquid flow through the fourth tubular member, second and third valves to selectively close the lower ends of the respective second and third tubular members, a pressure transducer and air-bleed valves connected to the upper ends of the second and third tubular member for sensing differentials in pressure between their interiors, and control means connected to operate the valves so that, the pressure transducer indicates changes in liquid levels caused by leakage.

One method according to the present invention for detecting liquid leakage in underground storage tanks includes the following steps: partially immersing the lower ends of first and second vertically-disposed tubular members in liquid in a tank, closing the upper and immersed ends of the first tubular member to prevent liquid and gas from escaping; and connecting a differential pressure transducer to the non-immersed ends of the tubular members to indicate changes in gas pressure between the interiors of the two tubular members and, thereby, to indicate variations in the liquid level within the tank.

In an alternative method according to the present invention, liquid leakage in underground storage tanks is detected by the steps of: immersing the lower ends of first and second vertically disposed tubular members in liquid storage tank; allowing the upper ends of the tubular members to vent into the atmosphere in the tank so that liquid from the tank fills the tubular members to an elevation equal to the liquid level in the tank; then, closing the lower end of the first tubular member for a period of time sufficient to allow the liquid elevation within the tank to change due to leakage; then sealing the upper ends of first and second tubular members and opening the lower end of the first tubular member while sensing differentials in gas pressure between the interiors of the first and second tubular members, thereby to detect variations of the liquid level within the tank.

In still another alternative method according to the present invention for detecting liquid leakage in underground storage tanks, the present invention comprises the steps of: submerging the lower ends of three vertically-disposed tubular members in liquid in a storage tank; through a fourth tubular member, providing liquid-flow of communication between the lower ends of the first and second tubular members; venting the upper ends of the three tubular members to the atmosphere within the tank so that the liquid level within the tubular members equalibrates at the liquid level within the tank; blocking liquid flow through the fourth tubular member; closing the submerged end of the second tubular member, and closing the upper ends of the second and third tubular members to prevent entrance of gases from the atmosphere in the tank; sensing differentials in gas pressure between the interiors of the second and third tubular members with a differential pressure transducer connected to the non-immersed ends of the first and second transducers and, thereby, indicating changes in the liquid level in the tank due to leakage.

The foregoing and other aspects of the present invention can be readily ascertained by reference to the following description and attached drawings which illustrate the preferred embodiment.

BRIEF DESCRIPTION OF THE DRAWINGS

FIG. 1 is a side sectional view of a system according to the present invention, portions of which are shown schematically, for detecting liquid leakage in storage tanks. A modification to the system is shown in phantom line.

FIG. 2 is a side sectional view, again partly shown schematically, of an alternative embodiment of the system according to the present invention.

FIGS. 3A-D are diagrams showing an operating sequence of the device of FIG. 2.

DETAILED DESCRIPTION OF PREFERRED EMBODIMENT

FIG. 1 shows a system, generally indicated by number 11, for detecting liquid leakage in a tank 13 containing a body of liquid 15. In this embodiment, system 11 generally includes first and second tubular members 19 and 21 that are stationarily mounted within tank 13 and vertically disposed such that their lower ends are immersed in liquid 15 and their upper ends are above the liquid surface. The tubular members 19 and 21 should be sufficiently long to encompass normal variations in liquid elevation within the tank over the expected test period, and their inside diameters should be sufficiently large to avoid capillary effects. Typically, tubular members 19 and 21 will be at least about 36 inches long and will have an inside diameter of about 0.5 inches. The length of the tubular member will obviously depend upon the diameter of the tank into which they extend, e.g., a tank that is 8 feet in diameter will require a tubular member over 96 inches long to reach the bottom of the tank. In practice, both tubular members 19 and 21 have substantially the same dimensions, but this is not required. Preferably, tubular members 19 and 21 are formed from copper tubing; however, other materials can be employed without substantially affecting performance.

Further in leakage detection system 11 of FIG. 1, first valve means in the form or a remotely-controllable valve 25 is connected to the lower end of tubular member 19. First valve means 25 can be, for example, a conventional gate valve; its function is to selectively prevent liquid flow into, or out of, tubular member 19. Connected to first valve means 25 is a control 29 that allows the valve to be opened or closed from a remote location, normally aboveground. Such controls are well known and may include hydraulic, pneumatic or electrical means to actuate first valve means 25.

A modification to the leak detection system is shown in phantom where a third horizontally disposed tubular member 26 may connect the lower ends of first and second tubular members 19 and 21. A second valve means 28 is connected to the third tubular member 26 to allow liquid to enter the third tubular member. On operation, the additional member and valve means provide means to amplify pressure differential as will be discussed later after an explanation of the basic system and the preferred mode of operation. Connected to the second valve mean is a control 30 that allows the valve to also be opened from a remote location.

As still further shown in FIG. 1, leakage detection system 11 includes a two-port pressure transducer 31 having its respective ports connected in gas-flow communication with the upper interior portions of tubular members 19 and 21, respectively. In practice, differential pressure transducer 31 is a conventional pressure sensor that functions to sense differentials in gas pressure between its two ports. Connected to differential pressure transducer 31 is a meter means shown as a meter 32, preferably of the digital type, so that readings of sensed differential pressures can be obtained at a remote location.

As also shown in FIG. 1, first and second air-bleed valves 33 and 35 are interposed between the respective ports of pressure transducer 31 and the interiors of respective tubular members 19 and 21. When open, air-bleed valves 33 and 35 permit gas to flow between the interior of the tubular member to which the valve is connected and the atmosphere within the tank; when closed, such flow is blocked but pressure transducer 31 is in gas-flow communication with the interior of the tubular member. For controlling air-bleed valves 33 and 35 from a remote location, controls 37 and 39 are connected to the respective valves. Again,, such controls are well known and can employ hydraulic, pneumatic or electrical means to actuate the valves. Controls 29, 37 and 39 comprise a control means to selectively operate their associated valves as described above.

The preferred mode of operation of leakage detection system 11 of FIG. 1 will now be described. It can be initially assumed that tubular members 19 and 21 are stationarily mounted with their lower ends immersed in liquid in tank 13, that air-bleed valves 33 and 35 above the liquid surface and that valve 25 is open. As a first step in operation, controls 37 and 39 are operated to open air-bleed valves 33 and 35, thereby allowing the liquid elevation within tubular members 19 and 21 to equalize with the liquid elevation within the tank and, therefore, there will be no differential pressure sensed by transducer 31. Also, with air-bleed valves 33 and 35 open, gas pressure within the tubular members above the liquid-gas interface will equilibrate with the gas pressure within the tank, and, therefore, there will be no differential pressure sensed by transducer 31. After a period sufficient to allow equilibrium to be established, controls 37 and 39 are operated to close air-bleed valves 33 and 35, thereby trapping gas within tubular members 19 and 21 above the liquid-gas interface. Then control 29 is operated to close first valve means 25 to prevent liquid from entering or escaping tubular member 19. Under such conditions, subsequent changes in the liquid level within tank 13 will not affect conditions within tubular member 19 but will alter the elevation of the column of liquid within tubular member 21 and, therefore, will change the pressure of gas above that liquid column. If the atmosphere within tank 13 were an ideal gas, its pressure would vary directly as the change in volume under isothermal conditions; since the atmosphere within an underground storage tank is normally air, its characteristics will normally be substantially the same as an ideal gas. Thus, differential in pressure between the gas Within tubular members 19 and 21, respectively, serves as a proxy measure for changes in the liquid level within tank 13 and such differentials are detected by pressure transducer 31. Those pressure differentials are displayed at a remote location by meter 32.

At this juncture, it may be appreciated that leakage detection system 11 does not require a calibration or compensation system for compensating for temperature effects. This is because temperature changes within tank 1 will normally affect both tubular members 19 and 21 equally. In other words, in terms of pressure differentials sensed by transducer 31, thermal effects cancel. It may also be appreciated that leakage detection system 11 does not require calibration for evaporative effects as long as there is not substantial venting of gas from tank 13 during the leakage detection period. This is because evaporative effects will be substantially equal within the tank and within the trapped gas spaces of tubular members 19 and 31.

An alternative mode of operation of leakage detection system 11 of FIG. 1 will now be described In this mode, the initial conditions are established as described previously, and then control 29 is operated to close valve 25 while leaving open air-bleed valves 33 and 35 for an appropriate "test" period, normally several minutes. Upon closure of first valve means 25, the height of the column of liquid within tubular member 19 becomes fixed. Then, during the test period, any leakage of liquid into or from tank 13 will cause a difference in elevation in the liquid column in tubular member 21 relative to the fixed-height column in tubular member 19 but tee gas pressure above both columns will remain equal. For example, if liquid leaks out of the tank during the test period, the liquid level within tubular member 21 will fall below the liquid level in tubular member 19 and, with air-bleed valves 33 and 35 open, the air pressure above the liquid columns in both tubular members 19 and 21 will remain equal. (Because the relatively short test period, changes in the column height in tubular member 19 due to thermal or evaporative effects are normally minor and can be ignored.)

Following the test period in this alternative mode of operation, air-bleed valves 33 and 35 are both closed, and then first valve means 25 is opened by control 29. Upon opening valve means 25, the difference between the liquid level within tubular member 19 and the liquid level within the tank will cause liquid to flow until a static pressure balance condition is reached. For example, if liquid has leaked out of the tank during the test period, liquid will flow out of tubular member 19 after first valve means 25 is opened, and such flow will continue until such time as there is a static pressure balance between the liquid columns within tubular members 19 and 21. (In the given example, the liquid level in tubular member 19 will fall until it substantially equals the liquid level in the tank. The flow induced by opening first valve means 25 in such circumstances will cause a pressure change in the gas space above the gas-liquid interface in tubular member 19, and the pressure change will be registered by transducer 31 and displayed by meter 32. Thus, in this mode of operation, pressure transducer 31 will again indicate the extent of liquid leakage from the tank; moreover, it should be appreciated that no compensation for thermal or evaporative effects is needed in this alternative mode of operation.

The modification of the leak detection system shown in phantom in FIG. 1 provides means to amplify the pressure differentials sensed by transducer 31. The third horizontally disposed tubular member 26 interconnects the first and second tubular members 19 and 21 to form a U-tube design. The U-tube design includes a second valve means 28 which provides a port to the liquid 15 to allow the third tubular member to be filled. The second valve means may be closed with respect to external liquid to form a closed system when readings are to be observed.

The operation of the modified system is essentially identical to that described above with respect to the alternative mode of operation except that the second valve means 28 must be initially opened when the air bleed valves 33 and 35 and the first valve means in the form of valve 25 are opened to allow liquid into first, second and third tubular members. The second valve means 28 remains open after valve 25 is closed during the test period. Second valve means 28 and air-bleed valves 33 and 35 are closed at the end of the test period, and first valve means 25 is opened. The step of interconnecting the lower ends of the first and second tubular members 19 and 21 creates a closed system. Assuming tank leakage, the flow induced by reopening of first valve means 25 within the closed systems will cause a pressure drop in the gas space above the gas-liquid interface in first tubular member 19 and will cause a pressure increase in the gas space above the gas-liquid interface in the second tubular member 21 and the pressure change will be registered by transducer 31. The interconnection of the first and second tubular members will thus serve to amplify the pressure differential to which the transducer 31 is exposed.

FIG. 2 shows an alternative embodiment of a leakage detection system, generally designated by the number 51. This leakage detection system includes three tubular members 53, 55 and 57, having generally the same dimensions and materials of construction as the tubular members 19 and 21 described in the embodiment of FIG. 1. In an arrangement also similar to FIG. 1, tubular members 53, 55 and 57 are vertically disposed at a fixed location with their lower ends immersed in the liquid in tank 13 and their upper ends above the liquid surface. In this embodiment, however, the lower end of first tubular member 5 is connected to he lower end of second tubular member 55 by a fourth tubular member 59. A first valve means shown as valve 65 is mounted at the lower end of first tubular member 53 adjacent fourth tubular member 59. Second and third valve means shown as valves 61 and 63 are mounted at the lower ends of second and third tubular members 55 and 57, respectively. In practice, the three valves 61, 63 and 65 are identical, and are substantially the same as valve 25 of FIG. 1. At the upper ends of second and third tubular members 55 and 57 are mounted air-bleed valves 71 and 73, respectively, which are substantially identical to valves 33 and 35 of FIG. 1.

As also shown in FIG. 2, a two-port pressure transducer 75 having a display meter 79 is connected with its ports in gas-flow communication with the upper ends of tubular members 55 and 57, respectively. Again, it should be appreciated that air-bleed valves 71 and 73 do not interfere with communication between the sensing ports of pressure transducer 7 and interior of tubular members 55 and 57. Thus, when air-bleed valves 71 and 73 are open, they allow gas to flow into, or out of, tubular members 55 and 57 depending upon the relative atmospheric pressure within the tank. When air-bleed valves 71 and 73 are closed, there is no air flow communication between the interiors of tubular members 55 and 57 and the surrounding atmosphere, but differential pressure transducer 75 senses the pressure within the tubular members.

A control means 81 is connected to the valves 59, 61, 63, 71 and 73 so that the valves can be individually operated from a remote aboveground location. It should be understood that control 81 allows each of the valves to be operated independently of the others. In practice, control 81 can use conventional hydraulic, pneumatic or electrical control.

Operation of leakage detection system 51 of FIG. 2 will now be described in conjunction with FIGS. 3A-D. Initially, it can be assumed that the lower ends of tubular members 61 and 63 are sufficiently immersed in liquid that there is a column of liquid of substantial height in the first, second and third tubular members 53, 55 and 57 and so that fourth tubular member 59 is completely filled with liquid. The first step in operation of leakage detective system 51, as indicated in FIG. 3A, is to open all valves of the system. With all valves open, the liquid elevation within tubular members 53, 55 and 57 equalizes with the liquid elevation within tank 13, and the gas pressure within each of the tubular members equalizes with the pressure of the tank atmosphere. Under such conditions, there is no output from differential pressure transducer 75.

The next step in operation of system 51 of FIG. 2, as indicated in FIG. 3B, is to close valves 63 and 65. Closure of valve 63 traps liquid within tubular members 57 and, likewise, closure of valve 65 traps liquid within tubular member 53. Because the upper ends of tubular members 53, 55 and 57 are all open to the atmosphere within tank 13, the gas pressures within those tubular members will equal the pressure in the tank, and there will be no output from differential pressure transducer 75. Under such conditions, if there is liquid leakage from tank 13, the liquid elevations within tubular members 53 and 57 will remain constant, and the liquid elevation within tubular member 55 will rise or fall with the changes in liquid elevation in tank 13. (A condition of leakage of liquid out of tank 13 is indicated by FIG. 3B.) In practice, the valve arrangement shown in FIG. 3B is maintained for a predetermined test period, normally less than one hour, during which the liquid level in the tank is expected to change due to leakage.

After the selected test period, valve 61 at the lower end of tubular member 55 is closed, air-bleed valves 71 and 73 are closed, and valve 63 is opened at the lower end of tubular member 57. This results in the valve arrangement shown in FIG. 3C. Closure of air-bleed valves 71 and 73 together with valve 61 traps liquid and gas within tubular member 55. Also, opening valve 63 allows liquid to flow into or out of tubular member 57; thus, if the liquid elevation within tubular member 57 exceeds the liquid elevation in tank 13, at the time of opening valve 63 liquid will flow out of the lower end of tubular member 57 and the pressure within tubular member 57 above the liquid-gas interface will become negative (i.e., the gas pressure within tubular member 57 decreases to a value below the atmospheric pressure in the tank). When equilibrium is reached, the elevation of liquid within tubular member 57 may be slightly above the liquid level within tank 13 because of the negative pressure. Under such conditions, pressure transducer 75 will record a differential pressure between the interiors of tubular members 55 and 57.

As depicted in FIG. 3D, the next step in operation of the system of FIG. 2 is to open valve 65, thereby allowing liquid-flow communication between tubular members 53 and 55 via fourth tubular member 59. Assuming the conditions that existed prior to opening valve 65 are those indicated in FIG. 3C, liquid will flow through member 59 so that the liquid elevation in tubular member 55 increases and the liquid elevation within tubular member 53 decreases until the two liquid elevations are equal (i.e., n static balance) but substantially above the liquid level in tank 13. As a result of statically balancing the liquid elevations within tubular members 53 and 55, the pressure of the gas above the liquid column in tubular member 55 will increase relative to the gas pressure within tubular member 57; that is, the gas within tubular member will be compressed above the pressure of the atmosphere within tank 13. Such an increase in pressure of the gas within tubular member 55 will be sensed by differential transducer 75 and, in turn, will appear as a read-out at meter 79. It should be appreciated that the step indicated by FIG. 3D facilitates detection of small amounts of leakage from the tank by, in essence, amplifying the pressure differentials in liquid detection system 51.

Although liquid levels within the three tubular members 53, 55 and 57 appear to be substantially equal in FIG. 3D, this is not necessarily the case. In an actual operating situation, the liquid level within tubular member 57 will usually be substantially different from the liquid level within the tubular members 53 and 55.

It may now be appreciated that leakage detection system 51 of FIG. 2, like the leakage detection system of FIG. 1, does not require calibration for temperature or evaporative effects. Again, this is because thermal and evaporative effects will be substantially equal within the tank and within the trapped gas spaces of the tubular members.

Although the present invention has been described with particular reference to the preferred embodiment, such disclosure should not be interpreted as limiting. For example, although leakage detection systems 11 and 51 have been described in the environment of underground liquid storage tanks, the same detection systems can be used to detect leakage in pipelines that are partially filled with liquid. Such alternatives and other modifications will no doubt become apparent to those skilled in the art after having read the preceding disclosure.

What is claimed is:

1. A method for detecting liquid leakage in underground storage tanks comprising the steps of:
   (a) providing first, second and third vertically-disposed tubular members with the lower ends of the first and second tubular members connected by a fourth tubular member;
   (b) submerging the lower ends of the first, second and third vertical-disposed tubular members in liquid in a storage tank and venting the upper ends of the first, second and third tubular members to the atmosphere within the tank so that the liquid level within the tubular members equals the liquid level within the tank;
   (c) blocking flow through the lower end of the fourth tubular member;
   (d) then closing the submerged end of the second tubular member while leaving the lower end of the third tubular member open to allow liquid to flow in and out of that open end and closing the upper ends of the second and third tubular members to prevent gas-flow communication between the interiors of the second and third tubular members and the atmosphere in the tank;

(e) sensing differentials in gas pressure between the interiors of the second and third tubular members with a differential pressure transducer and, thereby, indicating changes in the liquid level in the tank due to leakage.

2. A method according to claim 1 including the subsequent step of unblocking the flow of liquid through the fourth tubular member to allow the liquid level within the first and second tubular members to equilibrate while sensing the differential in pressure between the gases above the liquid level in the second and third tubular members.

3. A system for detecting liquid leakage in underground storage tanks and the like, comprising:
   (a) first and second vertically-disposed tubular members, each having upper and lower ends, respectively;
   (b) a first valve means mounted to selectively open and close the lower end of the first tubular member;
   (c) first and second air-bleed valves connected to the upper ends of the respective first and second tubular members to selectively allow gases to flow into those tubular members above the liquid level;
   (d) a third generally horizontally disposed tubular member connecting the lower ends of the first and second tubular members, said third tubular member including a second valve means connected to said third tubular member to open and close said third tubular member to outside liquid;
   (e) a differential pressure transducer connected t the upper ends of the first and second tubular members in gas flow communication with their interiors; and
   (f) control means to selectively operate the first valve means and the first and second air-bleed valves so that, when the first and second tubular members are partially immersed in liquid in the storage tank, the pressure transducer indicates changes in liquid levels caused by tank leakage.

4. A system according to claim 3 further including meter means to display output signals from the pressure transducer at a remote location.

5. A method of detecting liquid leakage in underground storage tanks and the like, comprising the steps of:
   (a) immersing the lower ends of first and second vertically-disposed tubular members in liquid in a storage tank;
   (b) allowing the upper ends of the first and second tubular members to vent to the atmosphere in the tank so that liquid from the tank fills the tubular members to an elevation equal to the liquid level in the tank;
   (c) closing the lower end of the first tubular member for a period of time sufficient to allow the liquid elevation within the tank to change due to leakage;
   (d) closing the upper ends of the first and second tubular members to prevent the venting of gases;
   (e) interconnecting the lower ends of the first and second vertically-disposed tubular members with third horizontally disposed tubular member after a period sufficient to allow the liquid elevation within tank to change due to leakage; and
   (f) opening the lower end of the first tubular member while sensing differentials in gas pressure between the interiors of the first and second tubular members due to changes in elevation of the liquid level within the tank.

6. A system for detecting liquid leakage in liquid storage tanks, comprising:
   (a) first, second and third tubular members, each having an upper and lower end;
   (b) a fourth tubular member connecting the lower ends of the first and second tubular members;
   (c) first valve means mounted to selectively block the fourth tubular member to prevent liquid flow communication between the first and second tubular members;
   (d) second and third valve means mounted to selectively close the lower ends of the second and third tubular members, respectively;
   (e) air-bleed valve means connected to the upper ends of the second and third tubular members to selectively allow gases to flow into those tubular members;
   (f) a pressure transducer connected to the upper ends of the second and third tubular members for sensing differentials in gas pressure between the interiors of the second and third tubular members when the same are partially immersed in liquid in a storage tank; and
   (g) control means to selectively operate the first, second and third valve means and the air-bleed valve mean whereby, when the tubular members are placed in tank with the liquid level above their lower ends, the control means can be operated to allow pressure transducer to indicate changes in liquid level in the tank caused by leakage.

7. A system according to claim 6 further including meter means to display output signals from the differential pressure transducer at a remote location.

* * * * *

UNITED STATES PATENT AND TRADEMARK OFFICE
CERTIFICATE OF CORRECTION

PATENT NO. : 4,791,814

DATED : December 20, 1988

INVENTOR(S) : Victor W. Nee

It is certified that error appears in the above-identified patent and that said Letters Patent is hereby corrected as shown below:

On the title page:
References Cited, before "10/1909 France", delete "392945" and insert --392943--.

Column 1, line 18, delete "los" and insert --loss--.

Column 2, line 38, following "vertically" insert -- - --, a hyphen.

Column 4, line 1, delete "mean" and insert --means--.

Column 4, line 37, following "surface" insert --,--, a comma.

Column 4, line 64, "differential" should read --differentials--.

Column 4, line 65, delete "Within" and insert --within--.

Column 5, line 7, delete "1" and insert --13--.

Column 5, line 18, following "described" insert --.--, a period.

Column 5, line 28, delete "tee" and insert --the--.

Column 6, line 40, delete "5" and insert --53--.

UNITED STATES PATENT AND TRADEMARK OFFICE
CERTIFICATE OF CORRECTION

PATENT NO. : 4,791,814

DATED : December 20, 1988

INVENTOR(S) : Victor W. Nee

It is certified that error appears in the above-identified patent and that said Letters Patent is hereby corrected as shown below:

Column 6, line 40, delete "he" and insert --the--.

Column 6, line 59, delete "7" and insert --75--.

Column 8, line 5, delete "n" and insert --in--.

Column 8, line 53, delete "vertical-disposed" and insert -- vertically-disposed --.

Column 9, line 31, delete "t" and insert --to--.

Column 10, line 9, following "with" insert --a--.

Column 10, line 12, following "within" insert --the--.

Column 10, line 44, following "in" insert --a--.

Signed and Sealed this

Tenth Day of April, 1990

Attest:

HARRY F. MANBECK, JR.

*Attesting Officer*      *Commissioner of Patents and Trademarks*